United States Patent [19]

Sobczak

[11] 4,283,858
[45] Aug. 18, 1981

[54] 45 DEGREE CHAMFER AND RADIUS GAUGE SET

[76] Inventor: Marian Sobczak, 75 Pinedale Rd., Hauppauge, N.Y. 11787

[21] Appl. No.: 92,350

[22] Filed: Nov. 8, 1979

[51] Int. Cl.³ .............................................. G01B 3/14
[52] U.S. Cl. .................................. 33/174 R; 33/178 B
[58] Field of Search ............ 33/168 R, 174 R, 174 G, 33/174 E, 178 B

[56] References Cited

U.S. PATENT DOCUMENTS

| | | | |
|---|---|---|---|
| 644,756 | 3/1900 | Bailey | 33/168 R |
| 867,011 | 9/1907 | Bromley | 33/178 B |
| 1,661,701 | 3/1928 | Michler | 33/168 R |
| 1,755,152 | 4/1930 | Parker | 33/178 B |
| 2,237,378 | 4/1941 | Thienemann | 33/168 R |

FOREIGN PATENT DOCUMENTS

| | | | |
|---|---|---|---|
| 1135192 | 4/1957 | France | 33/168 R |
| 265233 | 11/1949 | Switzerland | 33/168 R |

Primary Examiner—Richard R. Stearns
Attorney, Agent, or Firm—Richard L. Miller

[57] ABSTRACT

A set of gauges assembled into a single unit, each guage consisting of a flat tongue with a specific sized rounded corner and a 45 degree angle offset along one side edge thereof, each gauge having a different size offset steps, and all the tongues pivoting from a common shaft in a frame.

3 Claims, 4 Drawing Figures

U.S. Patent      Aug. 18, 1981      4,283,858
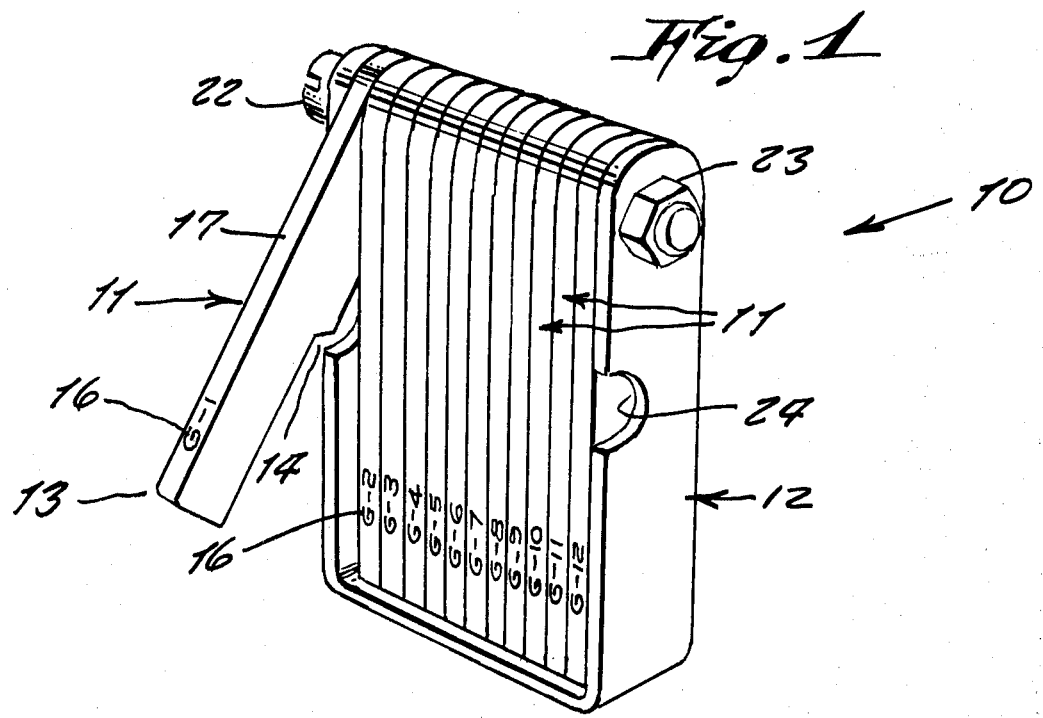
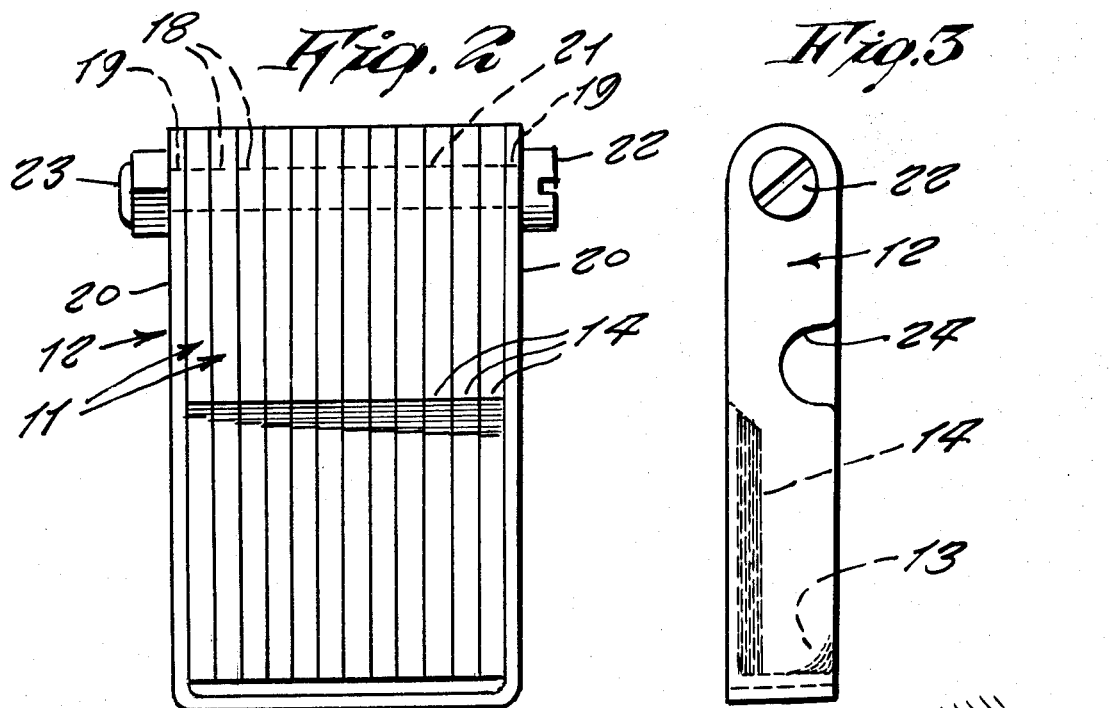
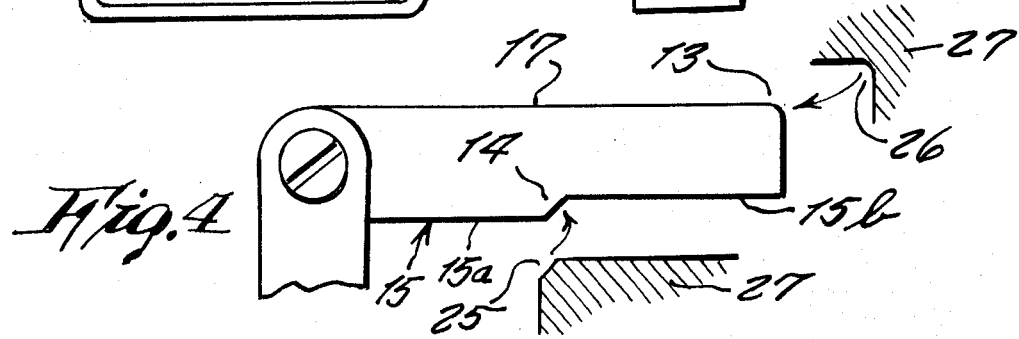

45 DEGREE CHAMFER AND RADIUS GAUGE SET

BACKGROUND OF THE INVENTION

This invention relates generally to gauges. It is well known to those acquainted with machine shop practice, that the measurement of a machined chamfer or rounded corner of a work piece can be difficult to check for accuracy in size when resorting to the usual checking method of trying to measure the depth of the corner by a linear scale laid along one side edge extending into the corner. Such measurement can be easily in error accordingly.

SUMMARY OF THE INVENTION

Therefore it is a principal object of the present invention to provide a set of templates each of which has a 45 degree chamfer offset and a rounded corner of different specific size so that in use it can be laid against a corner of a work piece for accurate measurement thereof.

Another object is to provide a gauge set wherein several of the templates are retained together for convenience in selecting a specific template during a corner measurement.

Further objects of the invention will appear as the description proceeds.

To the accomplishement of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a perspective view of the invention.
FIG. 2 is a side view thereof.
FIG. 3 is an end view.
FIG. 4 shows one of the gauge blades extended for use in measuring chamfer or a rounded corner.

DETAILED DESCRIPTION OF PREFERRED EMBODIMENTS

Referring now to the drawing in greater detail, the reference numeral 10 represents a 45 degree chamfer and radius gauge set according to the present invention, wherein there is a set of twelve gauges 11 supported in a frame 12. Each gauge comprises a flat, stainless steel template that measures 2½ inches long, ½ inch wide and 0.100 inch thick. One corner 13 thereof is machined to a precisely accurate roundness, and each template has a different radial size of the rounded corner. Each template also has a 45 degree angle offset 14 formed along one longitudinal size edge 15 thereof, the offset on each template being of a different specific length and the parallel edge components 15a and 15b are a precise elevation apart, accordingly. Each template is additionally identified by a different gauge numeral 16 being stamped or engraved on an opposite longitudinal edge 17 thereof. The twelve gauges or templates are arranged in the frame with a progressively larger (or smaller) size of offset and corner being on an adjacent gauge, as is evident by the offsets shown in FIG. 2 of the drawing.

More specifically, the various sizes of the offsets and rounded corners are as follows on the twelve gauges:

| GAUGE | OFFSET | ROUNDED CORNER |
|---|---|---|
| G-1 | .030 × 45° | 1/32R.(.787) |
| G-2 | .040 × 45° | 3/64R.(1.194) |
| G-3 | .050 × 45° | 1/16R.(1.575) |
| G-4 | .060 × 45° | 5/64R.(1.981) |
| G-5 | .070 × 45° | 3/32R.(2.388) |
| G-6 | .080 × 45° | 7/64R.(2.769) |
| G-7 | .090 × 45° | ⅛R.(3.175) |
| G-8 | .100 × 45° | 9/64R.(3.581) |
| G-9 | .110 × 45° | 5/32R.(3.962) |
| G-10 | .120 × 45° | 3/16R.(4.775) |
| G-11 | .130 × 45° | 15/64R.(5.944) |
| G-12 | .150 × 45° | ¼R.(6.350) |

Each gauge is rounded at one end and has a hole 18 therethrough for fitting on the frame.

The frame 12 comprises a stainless steel bar of ½ inch width and 0.080 thickness which is bent up into a U-shaped configuration. A hole 19 near an end of the frame legs 20 align axially and receive a bolt 21 which is also passed through holes 18 of the gauges fitted between the legs. The bolt head 22 rests against one of the legs and an elastic stop nut 23 threaded on the bolt, rests against the other leg. A notch 24 on each leg 20 allows easy grasp of the gauges for pivoting.

In use the gauges can individually pivot on the bolt so as to be brought into a utility position for measuring either a chamfer 25 or a corner 26 of a work piece 27. In use, the offset 14 rests against the chamfer, and the rounded corner 13 fits into the inside corner 26 shown in FIG. 4. The gauge corner 13 can be used to measure an outside corner of a work piece if it may be rested against an end of the work and aligned with the outside corner.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A 45 degree chamfer and radius gauge set, comprising in combination, a plurality of flat templates; and a U-shaped frame having fastener means across one of the ends thereof for fastening said templates thereto, said plurality of templates being pivotally mounted by said fastening means; each of said templates comprising a flat structure of rectangular cross-section with a first longitudinal side surface, a second longitudinal side surface, a first rounded transverse end surface at one end of the longtitudinal surfaces, and a second transverse end surface at the other end of said longitudinal side surfaces; said second longitudinal side surface having a first surface portion and a second surface portion offset from said first surface portion by a 45 degree angle offset, and that portion adjoining both said first longitudinal side surface and said second transverse end surface being rounded to a specific dimension to define a radious gauge, whereby said offset surface may measure a chamfered surface of a work piece and said rounded portion may measure a rounded surface of a work piece.

2. The 45 degree chamfer and radius gauge set according to claim 1, wherein each of said plurality of templates has its own specific 45 degree angle offset, and its own specific radius gauge different from another.

3. The 45 degree chamfer and radius gauge set according to claim 2, wherein said plurality of templates are arranged in said U-shaped holder in order such that the template having the greater sized 45 degree angle offset and radius gauge follows one having a lesser measuring size.

* * * * *